(12) United States Patent
Wu et al.

(10) Patent No.: US 11,215,865 B2
(45) Date of Patent: Jan. 4, 2022

(54) COLOR FILTER SUBSTRATE, MANUFACTURING METHOD THEREOF, AND RELATED DEVICES

(71) Applicants: BOE TECHNOLOGY GROUP CO., LTD., Beijing (CN); Beijing BOE Optoelectronics Technology Co., Ltd., Beijing (CN)

(72) Inventors: Xiaojun Wu, Beijing (CN); Zijing Zhang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

(*) Notice: Subject to any disclaimer, the term of this patent is extended or adjusted under 35 U.S.C. 154(b) by 434 days.

(21) Appl. No.: 15/777,292

(22) PCT Filed: Oct. 27, 2017

(86) PCT No.: PCT/CN2017/108020
§ 371 (c)(1),
(2) Date: May 18, 2018

(87) PCT Pub. No.: WO2018/188318
PCT Pub. Date: Oct. 18, 2018

(65) Prior Publication Data
US 2020/0310191 A1    Oct. 1, 2020

(30) Foreign Application Priority Data

Apr. 11, 2017 (CN) .......................... 201710232616.5

(51) Int. Cl.
*G02F 1/1335* (2006.01)
*G02F 1/1333* (2006.01)
*G02F 1/1339* (2006.01)

(52) U.S. Cl.
CPC .... *G02F 1/133516* (2013.01); *G02F 1/13394* (2013.01); *G02F 1/133371* (2013.01);
(Continued)

(58) Field of Classification Search
CPC ... G02B 5/201; G02B 5/223; G02F 1/133371; G02F 1/133516; G02F 1/133514;
(Continued)

(56) References Cited

U.S. PATENT DOCUMENTS 5,042,920 A * 8/1991 Yoshino ................. G02B 5/201
349/106
6,016,178 A    1/2000 Kataoka et al.
(Continued)

FOREIGN PATENT DOCUMENTS

CN    101086591 A    12/2007
CN    101506724 A    8/2009
(Continued)

OTHER PUBLICATIONS

Search Report and Written Opinion for International Application No. PCT/CN 2017/108020 dated Feb. 5, 2018.

*Primary Examiner* — Hoan C Nguyen
(74) *Attorney, Agent, or Firm* — Calfee, Halter & Griswold LLP

(57) ABSTRACT

A color filter substrate, a manufacturing method thereof, and related devices. The color filter substrate includes: a base plate; a color filter layer on the base plate; and a transparent layer on a side of the color filter layer away from the base plate. Specifically, the color filter layer includes multiple rows of color resist units, wherein color resist units in each row have at least three different colors. In addition, a first distance between a surface of the base plate close to the color resist units and a surface of the transparent layer away from the color resist units may be different for color resist units of different colors.

12 Claims, 5 Drawing Sheets

(52) U.S. Cl.
CPC .. *G02F 1/133514* (2013.01); *G02F 1/133519* (2021.01); *G02F 2201/50* (2013.01); *G02F 2201/52* (2013.01); *G09G 2300/0452* (2013.01)

(58) Field of Classification Search
CPC .......... G02F 1/13394; G02F 1/133519; G02F 2201/50; G09G 2300/0452
See application file for complete search history.

(56) References Cited

U.S. PATENT DOCUMENTS

| | | | | |
|---|---|---|---|---|
| 6,139,924 | A * | 10/2000 | Keyes | C09K 19/3491 428/1.1 |
| 6,661,484 | B1 * | 12/2003 | Iwai | G02F 1/133371 349/107 |
| 2007/0291574 | A1 | 12/2007 | Noda | |
| 2008/0003511 | A1 * | 1/2008 | Nam | G03F 7/0007 430/5 |
| 2009/0207349 | A1 | 8/2009 | Yoshimi et al. | |
| 2010/0066952 | A1 | 3/2010 | Tsuchiya et al. | |
| 2010/0182549 | A1 * | 7/2010 | Miyashita | G02F 1/133514 349/106 |
| 2012/0120119 | A1 * | 5/2012 | Park | G09G 3/2003 345/690 |
| 2017/0082864 | A1 * | 3/2017 | Zhao | H04N 13/324 |

FOREIGN PATENT DOCUMENTS

| | | | |
|---|---|---|---|
| CN | 101673007 A | | 3/2010 |
| CN | 102650750 A | | 8/2012 |
| CN | 106802511 A | | 6/2017 |
| JP | H09146124 A | | 6/1997 |
| JP | 11101906 A | * | 4/1999 |
| JP | 2000194017 A | * | 7/2000 |

* cited by examiner

| R | G | B | R | G | B | R | G | B |
|---|---|---|---|---|---|---|---|---|

| B | R | G | B | R | G | B | R | G |
|---|---|---|---|---|---|---|---|---|

Fig. 3c

| R | G | B | W | R | G | B | W | R | G | B | W |
|---|---|---|---|---|---|---|---|---|---|---|---|
| R | G | B | W | R | G | B | W | R | G | B | W |

Fig. 3d

| R | G | B | W | R | G | B | W | R | G | B | W |
|---|---|---|---|---|---|---|---|---|---|---|---|

| R | G | B | W | R | G | B | W | R | G | B | W |
|---|---|---|---|---|---|---|---|---|---|---|---|

Fig. 3e

| R | G | B | W | R | G | B | W | R | G | B | W |
|---|---|---|---|---|---|---|---|---|---|---|---|
| B | W | R | G | B | W | R | G | B | W | R | G |

Fig. 3f

a side of the color filter layer away from the base plate. Furthermore, in the liquid crystal display panel as proposed above, the color filter layer comprises multiple rows of color resist units, wherein color resist units in each row have at least three different colors. Besides, a first distance between a surface of the base plate close to the color resist units and a surface of the transparent layer away from the color resist units is different for color resist units of different colors.

COLOR FILTER SUBSTRATE, MANUFACTURING METHOD THEREOF, AND RELATED DEVICES

The present application is the U.S. national phase entry of PCT/CN2017/108020 filed on Oct. 27, 2017, which claims the priority of the Chinese patent application No. 201710232616.5 filed on Apr. 11, 2017, the entire disclosures of which are incorporated herein by reference.

TECHNICAL FIELD

The present disclosure relates to the field of display technologies, and in particular to a color filter substrate, a manufacturing method thereof, and related devices.

BACKGROUND ART

Nowadays, display technologies have been widely applied in televisions, cellphones and display of public information. Flat displays for image display are popularized for being ultra-thin and energy-saving, and have permeated into every aspect of people's life. In particular, more and more display products have begun to use transparent display techniques. Transparent display products boast advantages such as a light weight and thinness, portability, supportability of 3D display, and a higher user experience, thus being widely applied and developed in recent years. With a transparent display screen of a transparent display product, a user can perform operations on images displayed therein with the help of screen. Therefore, by means of the transparent display techniques, the user can not only see an object, but also read information about it. The transparent display techniques for instance can be applied to a vehicle windshield, a shop window and a smart refrigerator. However, for the transparent display techniques, the most crucial thing is that the display screen should have a higher transmittance.

Therefore, how to improve the transmittance of a display panel to realize transparent display is an urgent technical problem to be solved by those skilled in the art.

SUMMARY

Embodiments of the present disclosure provide a color filter substrate, a manufacturing method thereof, and related devices, so as to solve or at least alleviate one or more of the technical problems or defects as mentioned above.

According to an embodiment of the present disclosure, a color filter substrate is provided. The color filter substrate comprises: a base plate; a color filter layer on the base plate; and a transparent layer on a side of the color filter layer away from the base plate. Specifically, the color filter layer comprises multiple rows of color resist units, wherein color resist units in each row have at least three different colors. Besides, in the color filter substrate as proposed above, a first distance between a surface of the base plate close to the color resist units and a surface of the transparent layer away from the color resist units is different for color resist units of different colors.

According to another embodiment of the present disclosure, a liquid crystal display panel is provided. The liquid crystal display panel comprises: an array substrate and a color filter substrate arranged oppositely; and a liquid crystal layer sandwiched between the array substrate and the color filter substrate. Specifically, the color filter substrate comprises: a base plate; a color filter layer on a side of the base plate close to the array substrate; and a transparent layer on a side of the color filter layer away from the base plate. Furthermore, in the liquid crystal display panel as proposed above, the color filter layer comprises multiple rows of color resist units, wherein color resist units in each row have at least three different colors. Besides, a first distance between a surface of the base plate close to the color resist units and a surface of the transparent layer away from the color resist units is different for color resist units of different colors.

According to a possible implementation, in the liquid crystal display panel as provided by an embodiment of the present disclosure, the following equation holds for each color resist unit:

$$d = \frac{\Gamma\lambda}{2\pi\Delta n}.$$

In the above equation, $\Delta n$ is a birefringence of liquid crystals; $\lambda$ is a wavelength of incident light; $\Gamma=k\pi$, wherein k is a positive integer; and d is a cell thickness for a portion of the liquid crystal layer corresponding to the color resist unit, and equal to a second distance between opposite surfaces of the array substrate and the color filter substrate minus the first distance.

According to a possible implementation, in the liquid crystal display panel as provided by an embodiment of the present disclosure, the at least three different colors comprise red, green and blue, and each color resist unit has an aspect ratio in a range from 1:1 to 1:3.

According to a possible implementation, in the color filter layer of the liquid crystal display panel as provided by an embodiment of the present disclosure, the multiple rows of color resist units are arranged in a matrix, and the color resist unit in the $i^{th}$ row and the $j^{th}$ column has the same color as the color resist unit in the $(i+1)^{th}$ row and the $j^{th}$ column or as the color resist unit in the $(i+1)^{th}$ row and the $(j+1)^{th}$ column, wherein i and j are both positive integers.

Furthermore, according to a further specific implementation, in the color filter layer of the liquid crystal display panel as proposed above, two adjacent rows of color resist units are offset by half a color resist unit in a row direction, and the $i^{th}$ color resist unit in each row has the same color as the $(i+1)^{th}$ color resist unit in an adjacent row, wherein i is a positive integer.

According to a possible implementation, in the liquid crystal display panel as provided by an embodiment of the present disclosure, the at least three different colors comprise red, green, blue and white, and each color resist unit has an aspect ratio in a range from 1:1 to 1:3.

According to a possible implementation, in the color filter layer of the liquid crystal display panel as provided by an embodiment of the present disclosure, the multiple rows of color resist units are arranged in a matrix, and the color resist unit in the $i^{th}$ row and the $j^{th}$ column has the same color as the color resist unit in the $(i+1)^{th}$ row and the $j^{th}$ column, or as the color resist unit in the $(i+1)^{th}$ row and the $(j+1)^{th}$ column or as the color resist unit in the $(i+1)^{th}$ row and the $(j+2)^{th}$ column, wherein i and j are both positive integers.

According to a possible implementation, in the liquid crystal display panel as provided by an embodiment of the present disclosure, the transparent layer is made by a acryl type of epoxy resin. Obviously, those skilled in the art should understand that materials suitable for the transparent layer are not limited to the acryl type of epoxy resin only. Contrarily, any other suitable material can be used to manufacture the transparent layer, which is not limited here.

According to an embodiment of the present disclosure, a display device is further provided, comprising the liquid crystal display panel as provided in any of the above embodiments.

According to an embodiment of the present disclosure, a manufacturing method for the color filter substrate as mentioned above is further provided. Specifically, the manufacturing method comprises: forming a pattern of color filter layer on a base plate, wherein the color filter layer comprises multiple rows of color resist units, and color resist units in each row have at least three different colors; and forming further a transparent layer on the pattern of color filter layer, such that a first distance between a surface of the base plate close to the color resist units and a surface of the transparent layer away from the color resist units is different for color resist units of different colors.

According to a possible implementation, in the manufacturing method as provided by an embodiment of the present disclosure, the step of forming a transparent layer on the pattern of color filter layer comprises sub-steps of: coating a layer of insulating transparent material on the pattern of color filter layer; and performing a patterning process on the insulating transparent material to form the transparent layer.

According to an embodiment of the present disclosure, a manufacturing method for a liquid crystal display panel is further provided. The manufacturing method comprises: manufacturing a color filter substrate by using the manufacturing method for a color filter substrate as provided in any of the above embodiments; forming support posts on the color filter substrate and coating a sealant; dripping liquid crystals onto an array substrate; and aligning the color filter substrate with the array substrate.

BRIEF DESCRIPTION OF DRAWINGS

FIG. 2a and FIG. 2b are respectively schematic structure views for the liquid crystal display panel according to an embodiment of the present disclosure;

FIG. 3a-FIG. 3f are respectively schematic views showing how the color resist units are arranged according to an embodiment of the present disclosure;

DETAILED DESCRIPTION OF EMBODIMENTS

Specific embodiments of the color filter substrate, the manufacture method thereof and the related devices according to embodiments of the present disclosure will be explained below in detail with reference to the drawings.

Figure 1:
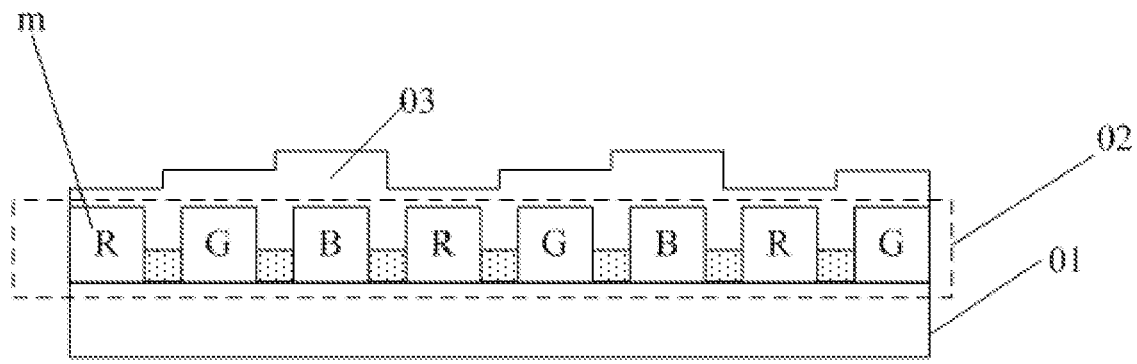
FIG. 1 is a schematic structure view for the color filter substrate according to an embodiment of the present disclosure.

According to an embodiment of the present disclosure, a color filter substrate is provided. As shown in FIG. 1, the color filter substrate can comprise a base plate 01 and a color filter layer 02 located on the base plate 01. Specifically, the color filter layer 02 comprises multiple rows of color resist units m, wherein color resist units in each row have at least three different colors. Furthermore, the color filter substrate can further comprise a transparent layer 03, wherein the transparent layer 03 is arranged on a side of the color filter layer 02 away from the base plate 01, and in particular covers the color filter layer 02. Referring to FIG. 1, in the color filter substrate, a first distance between a surface of the base plate 01 close to the color resist units m (i.e., an upper surface of the base plate 01) and a surface of the transparent layer 03 away from the color resist units m (i.e., an upper surface of the transparent layer 03) is different for color resist units of different colors (e.g., color resist units B in FIG. 1). Exemplarily, for green, red and blue color resist units, the first distance gradually increases from green to red and then to blue.

It should be noted that in the present disclosure, the expression of "first distance" means a distance including the thickness of a color resist unit and the thickness of a portion of transparent layer corresponding thereto. Color resist units of different colors may have the same thickness, or different thicknesses. A skilled person shall easily obtain suitable thicknesses for color resist units of different colors, such as based on the color specification of specific displays.

According to an embodiment of the present disclosure, in the color filter substrate as proposed above, the first distance between the upper surface of the transparent layer 03 corresponding to the color resist units m of different colors and the upper surface of the base plate 01 is different, as shown in FIG. 1. This means that if the color resist units m of different colors have a same thickness, as shown in FIG. 1, different portions of the transparent layer corresponding to the color resist units m of different colors will have different thicknesses. For instance, in FIG. 1, color resist units of R, G, and B colors are taken as an example. In this case, portions of the transparent layer corresponding respectively to the color resist units m of R, G, and B colors obviously have different thicknesses. In this way, when the color filter substrate is applied to a liquid crystal display panel, the color resist units of different colors will correspond to different cell thicknesses, because typically a distance between the array substrate and the color filter substrate will be constant in the liquid crystal display panel. I.e., it remains the same across the entire display panel. In particular, different cell thicknesses corresponding to color resist units of different colors can be respectively selected such that light of a corresponding color is emitted out from the display panel at the maximum transmittance. Thereby, when white light or natural light is incident on the liquid crystal display panel, the transmittance of the entire liquid crystal display panel is maximized, because light of each and every color has the maximum transmittance. This helps to facilitate the realization of transparent display with high transmittance.

Figure 2A:
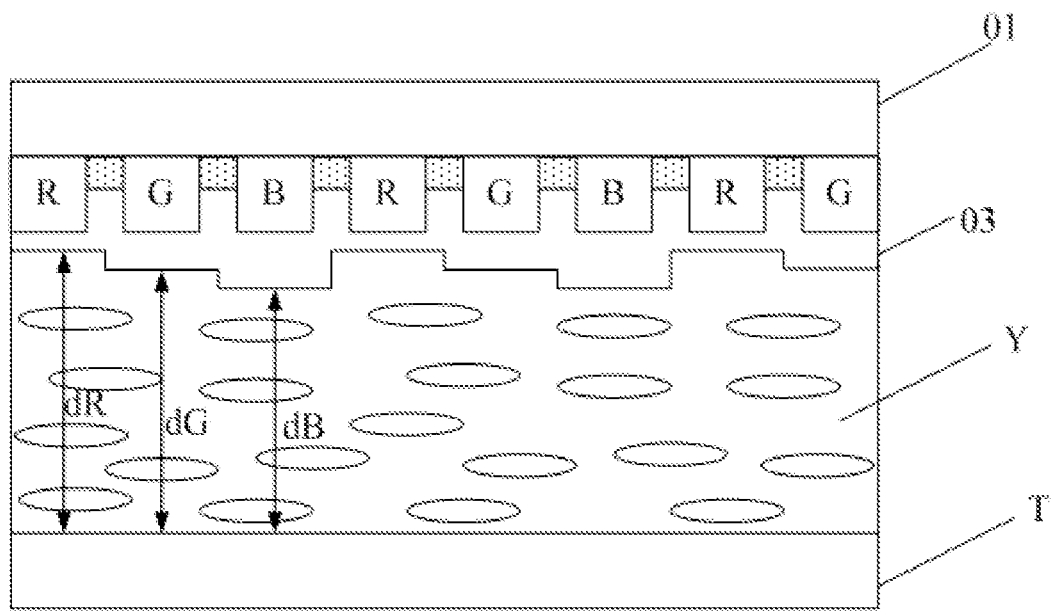
Figures 2B, 3A, 3B:
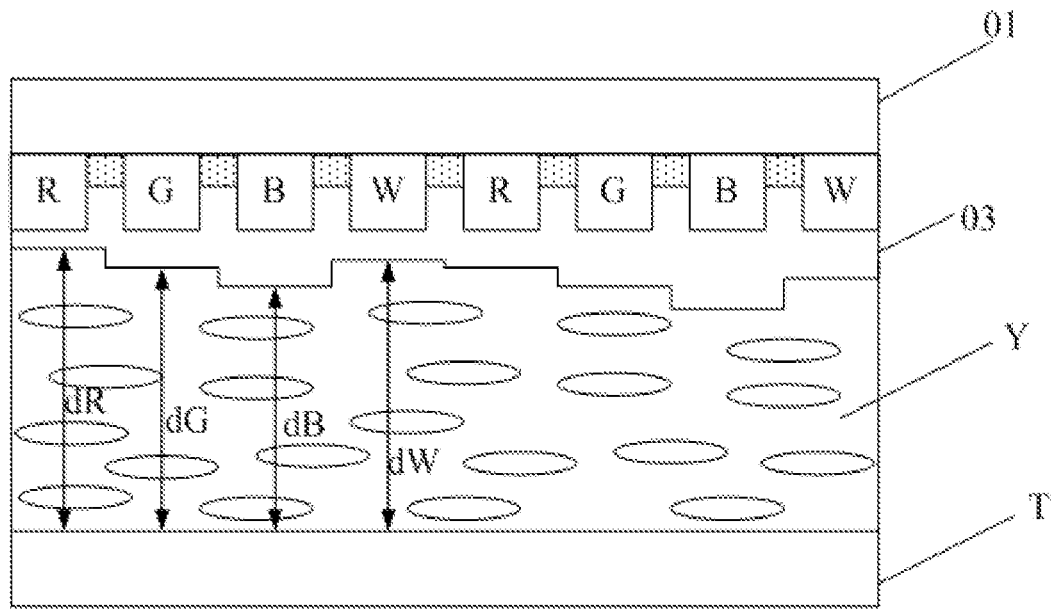

According to an embodiment of the present disclosure, a liquid crystal display panel is further provided. As shown in FIGS. 2a and 2b, the liquid crystal display device can comprise: an array substrate T and the above color filter substrate as arranged oppositely; and a liquid crystal layer Y sandwiched between the array substrate T and the color filter substrate. Specifically, as shown in FIG. 2a, in the liquid crystal display panel according to an embodiment of the present disclosure, the color resist units have three colors respectively, i.e., red R, green G and blue B. Moreover, the range of the aspect ratio for each color resist unit is further selected to be 1:1-1:3. In an exemplary embodiment, the color resist units are arranged in a matrix on the color filter substrate, and in two adjacent rows of color resist units, color resist units having a same column position have a same color, as shown in FIG. 3a. Alternatively, in other examples, color resist units having a same color in two adjacent rows of color resist units are offset by a width of one color resist unit in a row direction, as shown in FIG. 3b. Further alternatively, color resist units having a same color in two adjacent rows of color resist units are offset by a width of one and a half color resist units in a row direction, as shown in FIG. 3c. Furthermore, according to other embodiments, in the above liquid crystal display panel, the color resist units can further have four colors respectively, i.e., red R, green G, blue B and white W, as shown in FIG. 2b. Moreover, the range of the aspect ratio for each color resist unit is 1:1-1:3. In this case, the color resist units are arranged in a matrix on the color filter substrate. Optionally, in two adjacent rows of color resist units, color resist units having a same column position have a same color, as shown in FIG. 3d. Alternatively, color resist units having a same color in two adjacent rows of color resist units are offset by a width of one color resist unit in a row direction, as shown in FIG. 3e. Further in an exemplary embodiment, color resist units having a same color in two adjacent rows of color resist units are offset by a width of two color resist units in a row direction, as shown in FIG. 3f.

Specifically, in the liquid crystal display panel according to an embodiment of the present disclosure, each row of the color filter layer can comprise color resist units of three or four colors, and the color resist units can also be arranged in various manners. In an embodiment of the present disclosure, the color resist units can be arranged in any of the above manners, which is not limited herein. Therefore, the thickness of the transparent layer is selected such that color resist units of different colors correspond to different cell thicknesses of liquid crystal. This helps to realize a transparent display with high transmittance. In the technical solution of the present disclosure where transparent display is realized by adding a transparent layer, no particular structure for the color filter substrate is required, and no special arrangement for color resist units of various colors is needed. This helps to promote the applicability of the technical solution in the present disclosure.

According to a specific embodiment, in the liquid crystal display panel provided by an embodiment of the present disclosure, the first distance between the surface of the base plate close to the color resist units and the surface of the transparent layer away from the color resist units plus the cell thickness of the corresponding liquid crystal portion equals a second distance between the array substrate and the color filter substrate. Specifically, for each color resist unit, such as in a full bright mode, for example at a display gray scale of 255, the following equation satisfies:

$$T = \frac{1}{2}\sin^2 2V\Phi \sin^2 \frac{\Gamma}{2},$$

$$\Gamma = \frac{2\pi \Delta nd}{\lambda}.$$

In the above equations, T is the transmittance of light corresponding to the color resist unit; $V\Phi$ is an azimuth angle of the liquid crystal molecules; $\Delta n$ is a birefringence of the liquid crystals; $\lambda$ is a wavelength of the incident light; d is a cell thickness of liquid crystal; and $\Gamma$ takes the value of $k\pi$ (wherein k is a positive integer). Specifically, as can be seen from the above equations, when $$\sin^2 \frac{\Gamma}{2} = 1,$$

i.e., when $\Gamma = k\pi$ (wherein k is a positive integer), the transmittance of light corresponding to the color resist unit is maximum, no matter how the wavelength (i.e., color) of the light is. According to the equation:

$$\Gamma = \frac{2\pi \Delta nd}{\lambda},$$

it can be obtained that $$d = \frac{\Gamma \lambda}{2\pi \Delta n}.$$

Therefore, when $\Gamma = k\pi$ (wherein k is a positive integer), i.e., $\Delta nd = \lambda/2$, light corresponding to color resist units of different colors all have the maximum transmittance. However, since light of different colors have different wavelengths, obviously it can be known from $\Delta nd = \lambda/2$ that at a same display gray scale (e.g., at a display gray scale of 255), the cell thickness d associated with the maximum transmittance will be different for light of different colors. To take a full bright mode as an example, for instance, at a display gray scale of 255, the liquid crystal layer has a same deflection degree or ordered degree, thus having a same birefringence $\Delta n$. In this case, the cell thickness associated with the maximum transmittance for light of different colors (e.g., red light, green light or blue light) can be obtained from the above equations.

Figure 4:
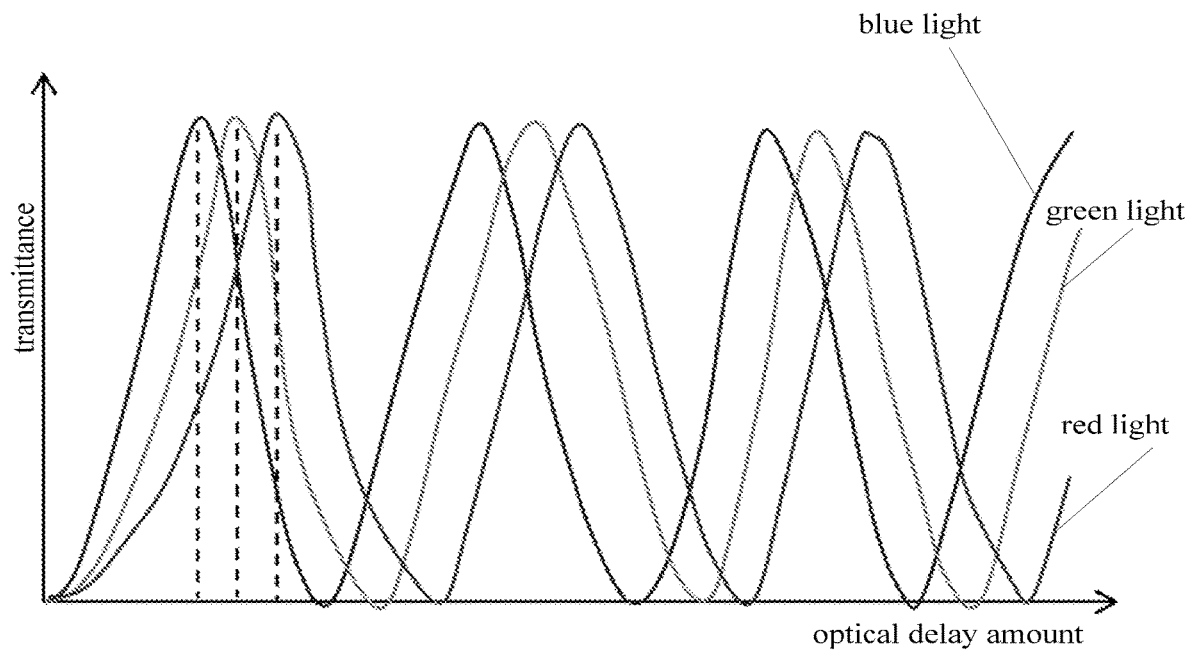
FIG. 4 is a schematic curve graph showing how the transmittances of light of different colors at a particular display gray scale vary with optical delay amounts according to an embodiment of the present disclosure.

Specifically, referring to FIG. 2a and FIG. 2b, the liquid crystal display panel comprises: an array substrate T, a liquid crystal layer Y, a color filter substrate, RGB (as shown in FIG. 2a) or RGBW (as shown in FIG. 2b) color resist units arranged on the color filter substrate, and a transparent layer 03 located on each color resist unit. In an embodiment of the present disclosure, a transparent layer with different thicknesses is manufactured on color resist units of different colors in the color filter substrate respectively, such that the color resist units of different colors correspond to different cell thicknesses of liquid crystal. As shown in FIG. 4, the maximum transmittances (peak positions) for red light, green light and blue light correspond respectively to different optical delay amounts, i.e., $^{\Delta n}d$. Therefore, in an embodiment of the present disclosure, the added transparent layer can enable color resist units of different colors to correspond to different cell thicknesses of liquid crystal, and light of different colors pass through the corresponding color resist units at a maximum transmittance. As shown in FIG. 2a, the cell thicknesses associated with the maximum transmittances of red light, green light and blue light are respectively dR, dG and dB. Similarly, as shown in FIG. 2b, the cell thicknesses associated with the maximum transmittances of red light, green light, blue light and white light are respectively dR, dG, dB and dW. In this way, when white light or natural light is incident on the liquid crystal display device, the transmittance of the entire liquid crystal display panel is maximized because light of each and every wavelength has the maximum transmittance. This helps to facilitate the realization of a transparent display with high transmittance. It should be pointed out that the white color resist units on the color filter substrate can be made of a same material as the transparent layer.

According to a specific embodiment, in the liquid crystal display panel provided by an embodiment of the present disclosure, the transparent layer can be made by a acryl type of epoxy resin, for example, epoxy acrylate resin. Besides, in other embodiments, the thickness of the transparent layer is no greater than 0.5 µm, so as to prevent the final transmittance of the liquid crystal display panel from being influenced by the added film layer.

Based on a same inventive concept, an embodiment of the present disclosure further provides a display device. The display device comprises the liquid crystal display panel as described in any of the above embodiments. The display device can be any product or component having a display function, such as a cellphone, a tablet computer, a television, a display, a notebook computer, a digital photo frame, a navigator and the like. Since the principle for solving problems in the display device is similar to that in the liquid crystal display panel, for implementations of the display device, implementations of the liquid crystal display panel can be referred to, which will not be repeated herein for simplicity.

Figure 5:
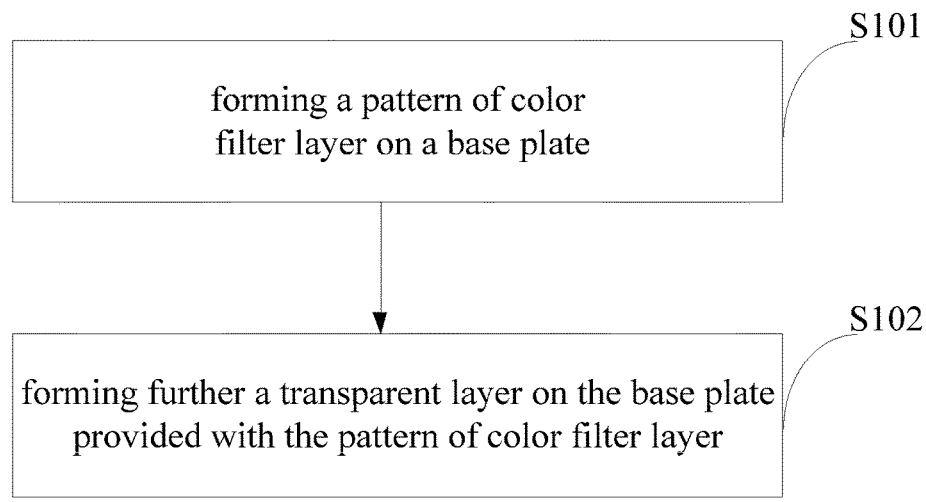
FIG. 5 is a flow chart of the manufacturing method for a color filter substrate according to an embodiment of the present disclosure.

According to a same inventive concept, a manufacturing method for a color filter substrate is further provided. As shown in FIG. 5, the manufacturing method can comprise: S101, forming a pattern of color filter layer on a base plate, wherein the color filter layer comprises multiple rows of color resist units, and color resist units in each row have at least three different colors; and S102, forming further a transparent layer on the base plate provided with the pattern of color filter layer, such that a first distance between a surface of the base plate close to the color resist units and a surface of the transparent layer away from the color resist units is different for color resist units of different colors.

In the above manufacturing method provided by an embodiment of the present disclosure, a transparent layer is manufactured on a color filter layer, and portions of the transparent layer corresponding to color resist units of different colors have different thicknesses. In this way, the cell thicknesses of liquid crystal portions corresponding to color resist units of different colors are made different. Therefore, when the color filter substrate is applied in a liquid crystal display panel, suitable parameters can be selected such that the cell thicknesses of liquid crystal portions corresponding to color resist units of different colors allow light of corresponding colors to pass through at a maximum transmittance. In this case, when white light or natural light is incident on the liquid crystal display panel, the transmittance of the entire liquid crystal display panel is maximized because light of different colors has a maximum transmittance. This helps to facilitate the realization of a transparent display with high transmittance.

According to a specific embodiment, in the manufacturing method provided by an embodiment of the present disclosure, the transparent layer can be manufactured by using any existing patterning process without any requirement for a new manufacturing process. As an example, step S102 can comprise sub-steps of: coating a layer of insulating transparent material on the base plate provided with the pattern of color filter layer; and performing a patterning process on the insulating transparent material to form a transparent layer.

Figure 6:
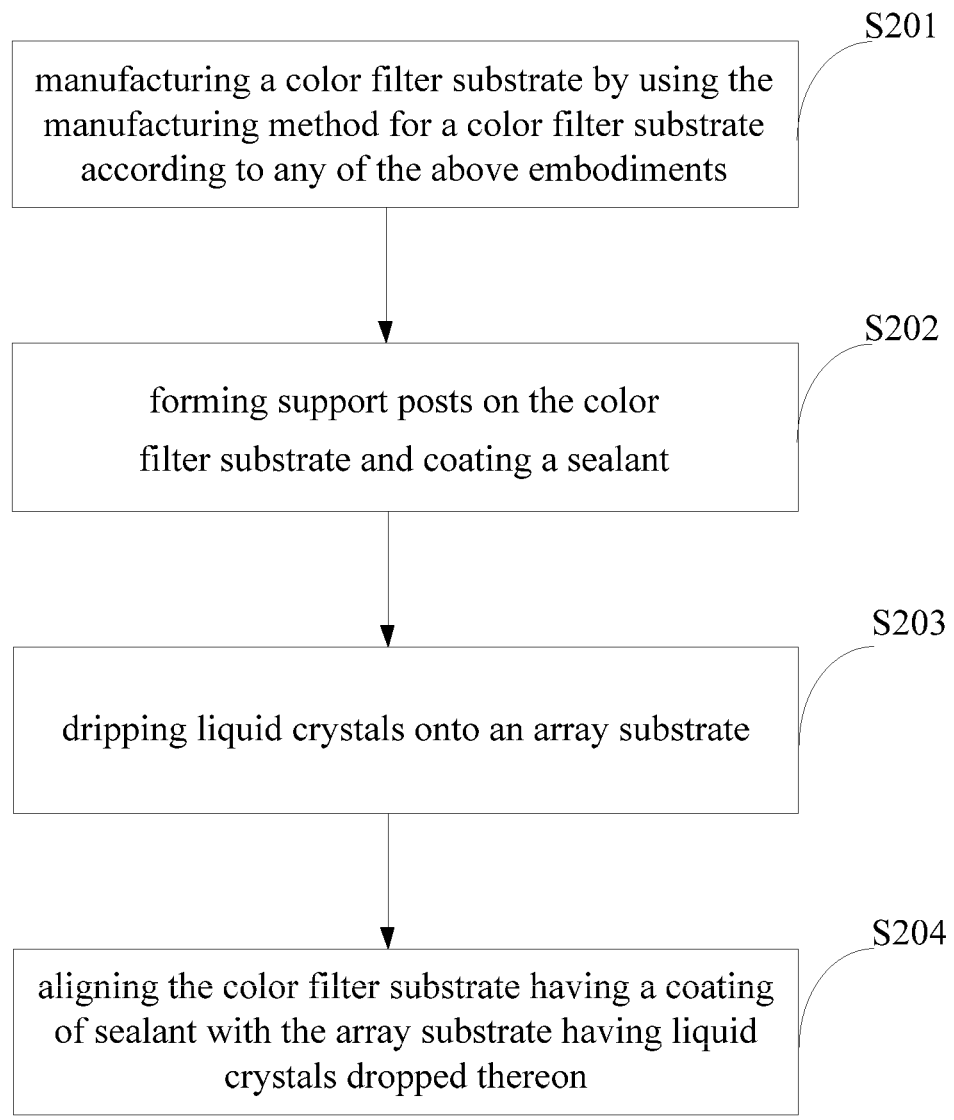
FIG. 6 is a flow chart of the manufacturing method for a liquid crystal display panel according to an embodiment of the present disclosure.

According to a same inventive concept, a manufacturing method for a liquid crystal display panel is further provided. As shown in FIG. 6, the manufacturing method comprises: S201, manufacturing a color filter substrate by using the manufacturing method for a color filter substrate according to any of the above embodiments; S202, forming support posts on the color filter substrate and coating a sealant; S203, dripping liquid crystals onto an array substrate; and S204, aligning the color filter substrate having a coating of sealant with the array substrate having the liquid crystals dripped thereon.

Specifically, the manufacturing method for a liquid crystal display panel will be illustrated with the following embodiments. Exemplarily, the manufacturing process can comprise steps as follows.

In a first step, a black matrix and a color filter layer are formed sequentially on a color filter substrate. Specifically, the color filter layer can comprise multiple rows of color resist units, and color resist units in each row have three colors of RGB or four colors of RGBW. If the three colors of RGB are chosen, the thicknesses of R color resist units, G color resist units and B color resist units are respectively 1.15 µm, 1.8 µm, 1.8 µm and 1.8 µm. In a similar manner, if the four colors of RGBW are chosen, the thicknesses of R color resist units, G color resist units, B color resist units and W color resist units are respectively 1.10 µm, 1.6 µm, 1.6 µm, 1.6 µm and 1.6 µm.

In a second step, a transparent layer is formed on the color filter layer by a patterning process. Specifically, portions of the transparent layer corresponding to R, G and B color resist units have a thickness of 1.7 µm, 1.3 µm and 1.0 µm respectively. Similarly, portions of the transparent layer corresponding to R, G, B and W color resist units have a thickness of 1.9 µm, 1.5 µm, 1.2 µm and 1.7 µm respectively.

In a third step, support posts are manufactured on the color filter substrate provided with the transparent layer, and a coating of sealant is further applied. Specifically, the sealant is further required to be coated in the dark and applied uniformly.

In a fourth step, liquid crystals are dripped onto an array substrate.

Finally, in a fifth step, the array substrate having liquid crystals dripped thereon is aligned with the color filter substrate having a coating of sealant, so as to form a liquid crystal panel.

According to embodiments of the present disclosure, a color filter substrate, a manufacturing method therefore, and related devices are provided. The color filter substrate comprises: a base plate; a color filter layer located on the base plate; and a transparent layer arranged on a side of the color filter layer away from the base plate. Specifically, the color filter layer comprises multiple rows of color resist units, wherein color resist units in each row have at least three different colors. Besides, in the color filter substrate, a first distance between a surface of the base plate close to the color resist units and a surface of the transparent layer away from the color resist units is different for color resist units of different colors. In this way, according to an embodiment of the present disclosure, a transparent layer is arranged on a color filter layer of a color filter substrate, and portions of the transparent layer corresponding to color resist units of different colors have different thicknesses. Therefore, when the color filter substrate is applied in a liquid crystal display panel, cell thicknesses of liquid crystal corresponding to color resist units of different colors will be different. In particular, suitable parameters can be selected such that the cell thicknesses of liquid crystal corresponding to color resist units of different colors allow light of corresponding colors to pass through at a maximum transmittance. Thereby, when white light or natural light is incident on the liquid crystal display panel, the transmittance of the entire liquid crystal display panel will be maximized because light of all colors have the maximum transmittance. This helps to facilitate the realization of a transparent display with high transmittance.

Obviously, those skilled in the art can make various modifications and variations to the present disclosure without departing from the spirit and the scope of it. In this case, if these modifications and variations to the present disclosure fall within the scope of the claims of the present disclosure and the equivalent techniques thereof, the present disclosure is intended to include them too.

The invention claimed is:

1. A liquid crystal display panel, comprising:
   an array substrate,
   a color filter substrate arranged opposite the array substrate;
   a liquid crystal layer between the array substrate and the color filter substrate, and
   a white light source configured to emit white light passing through the liquid crystal layer and the color filter substrate,
   wherein the color filter substrate comprises:
      a base plate;
      a color filter layer, wherein the color filter layer is disposed on a side of the base plate close to the array substrate, and wherein the color filter layer comprises multiple rows of color resist units, the color resist units in each row having at least four different colors, and
      a transparent layer on a side of the color filter layer away from the base plate and covering the color resist units of all of the at least four different colors, wherein a first distance of any one of the color resist units of the all of the at least four different colors is different from a first distance of any other of the color resist units of the all of the at least four different colors, such that portions of the liquid crystal layer corresponding to color resist units of different colors have different cell thicknesses, wherein the first distance is a distance between a surface of the base plate close to the color resist units and a surface of the transparent layer away from the color resist units, wherein the transparent layer consists of an acryl type of epoxy resin, and wherein the color resist units of the all of the at least four different colors comprises a red color resist unit, a green color resist unit, a blue color resist unit and a white color resist unit, wherein the white color resist unit is made of a transparent material allowing the white light emitted by the white light source to pass through, and the transparent material is a same material as the transparent layer.

2. The liquid crystal display panel according to claim 1, wherein the following equation holds for the red color resist unit, the green color resist unit and the blue color resist unit:

$$d = \frac{\Gamma \lambda}{2\pi \Delta n}$$

and wherein, $\Delta n$ is a birefringence of liquid crystals, $\lambda$ is a wavelength of incident light, $r=k\pi$, wherein k is a positive integer, and d is a cell thickness for a portion of the liquid crystal layer corresponding to the red color resist unit, the green color resist unit and the blue color resist unit and d is equal to a second distance between opposite surfaces of the array substrate and the color filter substrate minus the first distance.

3. The liquid crystal display panel according to claim 1, wherein the at least four different colors comprise red, green, blue and white, and each color resist unit has an aspect ratio in a range from 1:1 to 1:3.

4. The liquid crystal display panel according to claim 3, wherein in the color filter layer, the multiple rows of color resist units are arranged in a matrix, and a color resist unit in an $i^{th}$ row and a $j^{th}$ column has a same color as a color resist unit in an $(i+1)^{th}$ row and the $j^{th}$ column, or as the color resist unit in the $(i+1)^{th}$ row and the $(j+1)^{th}$ column, or as the color resist unit in the $(i+1)^{th}$ row and the $(j+2)^{th}$ column, wherein i and j are both positive integers.

5. A display device, comprising the liquid crystal display panel according to claim 1.

6. The display device according to claim 5, wherein the following equation holds for the red color resist unit, the green color resist unit and the blue color resist unit:

$$d = \frac{\Gamma \lambda}{2\pi \Delta n}$$

wherein $\Delta n$ is a birefringence of liquid crystals, $\lambda$ is a wavelength of incident light, $r = k\pi$, wherein k is a positive integer, and d is a cell thickness for a portion of the liquid crystal layer corresponding to the red color resist unit, the green color resist unit and the blue color resist unit and d is equal to a second distance between opposite surfaces of the array substrate and the color filter substrate minus the first distance.

7. The display device according to claim 5, wherein the at least four different colors comprise red, green, blue and white, and each color resist unit has an aspect ratio in a range from 1:1 to 1:3.

8. The display device according to claim 7, wherein in the color filter layer, the multiple rows of color resist units are arranged in a matrix, and a color resist unit in an $i^{th}$ row and a $j^{th}$ column has a same color as a color resist unit in an $(i+1)^{th}$ row and the $j^{th}$ column, or as a color resist unit in the $(i+1)^{th}$ row and a $(j+1)^{th}$ column, or as a color resist unit in the $(i+1)^{th}$ row and a $(j+2)^{th}$ column, wherein i and j are both positive integers.

9. A manufacturing method for production of a liquid crystal display panel, the liquid crystal display panel comprising a color filter substrate, a white light source and a liquid crystal layer, the color filter substrate comprising:
   a base plate;
   a color filter layer on the base plate,
   a transparent layer on a side of the color filter layer facing away from the base plate and covering the color resist units of all of the at least four different colors;
   wherein the white light source is configured to emit white light passing through the liquid crystal layer and the color filter substrate, and
   wherein the manufacturing method comprises:
      forming a pattern of the color filter layer on the base plate, wherein the color filter layer comprises multiple rows of color resist units, wherein the color resist units in each row have at least four different colors; and
      forming the transparent layer on the pattern of color filter layer, wherein a first distance of any one of the color resist units of the all of the at least four different colors is different from a first distance of any other of the color resist units of the all of the at least four different colors, wherein the first distance is a distance between a surface of the base plate close to the color resist units and a surface of the transparent layer away from the color resist units, wherein the transparent layer consists of an acryl type of epoxy resin, and wherein the color resist units of the all of the at least four different colors comprises a red color resist unit, a green color resist unit, a blue color resist unit and a white color resist unit, wherein the white color resist unit is made of a transparent material allowing the white light emitted by the white light source to pass through, and the transparent material is a same material as the transparent layer.

10. The manufacturing method according to claim 9, wherein the step of forming a transparent layer on the pattern of color filter layer comprises:
   coating a layer of insulating transparent material on the pattern of the color filter layer; and
   performing a patterning process on the insulating transparent material to form the transparent layer.

11. A manufacturing method for a liquid crystal display panel, comprising:
   manufacturing a color filter substrate by using the manufacturing method according to claim 9;
   forming support posts on the color filter substrate and coating with a sealant;
   dripping liquid crystals onto an array substrate; and
   aligning the color filter substrate with the array substrate.

12. A liquid crystal display panel, comprising:
   an array substrate,
   a color filter substrate arranged opposite the array substrate; and
   a liquid crystal layer between the array substrate and the color filter substrate, wherein the color filter substrate comprises:
   a base plate;
   a color filter layer, wherein the color filter layer is disposed on a side of the base plate close to the array substrate, and wherein the color filter layer comprises multiple rows of color resist units, the color resist units in each row having at least four different colors, and
   a transparent layer on a side of the color filter layer away from the base plate and covering the color resist units of all of the at least four different colors, wherein a first distance of any one of the color resist units of the all of the at least four different colors is different from a first distance of any other of the color resist units of the all of the at least four different colors, such that portions of the liquid crystal layer corresponding to color resist units of different colors have different cell thicknesses, wherein the first distance is a distance between a surface of the base plate close to the color resist units and a surface of the transparent layer away from the color resist units, wherein the color resist units of the all of the at least four different colors comprises a red color resist unit, a green color resist unit, a blue color resist unit and a white color resist unit, wherein the first distance of the red color resist unit is larger than the first distance of the white color resist units, the first distance of the white color resist unit is larger than the first distance of the green color resist units, and the first distance of the green color resist unit is larger than the first distance of the blue color resist units.

* * * * *

UNITED STATES PATENT AND TRADEMARK OFFICE
CERTIFICATE OF CORRECTION

PATENT NO. : 11,215,865 B2
APPLICATION NO. : 15/777292
DATED : January 4, 2022
INVENTOR(S) : Xiaojuan Wu et al.

It is certified that error appears in the above-identified patent and that said Letters Patent is hereby corrected as shown below:

On the Title Page

The first name of the first inventor in item (72):
Xiaojun Wu
Should read:
---Xiaojuan Wu---.

Signed and Sealed this
First Day of March, 2022

Drew Hirshfeld
*Performing the Functions and Duties of the
Under Secretary of Commerce for Intellectual Property and
Director of the United States Patent and Trademark Office*